UNITED STATES PATENT OFFICE.

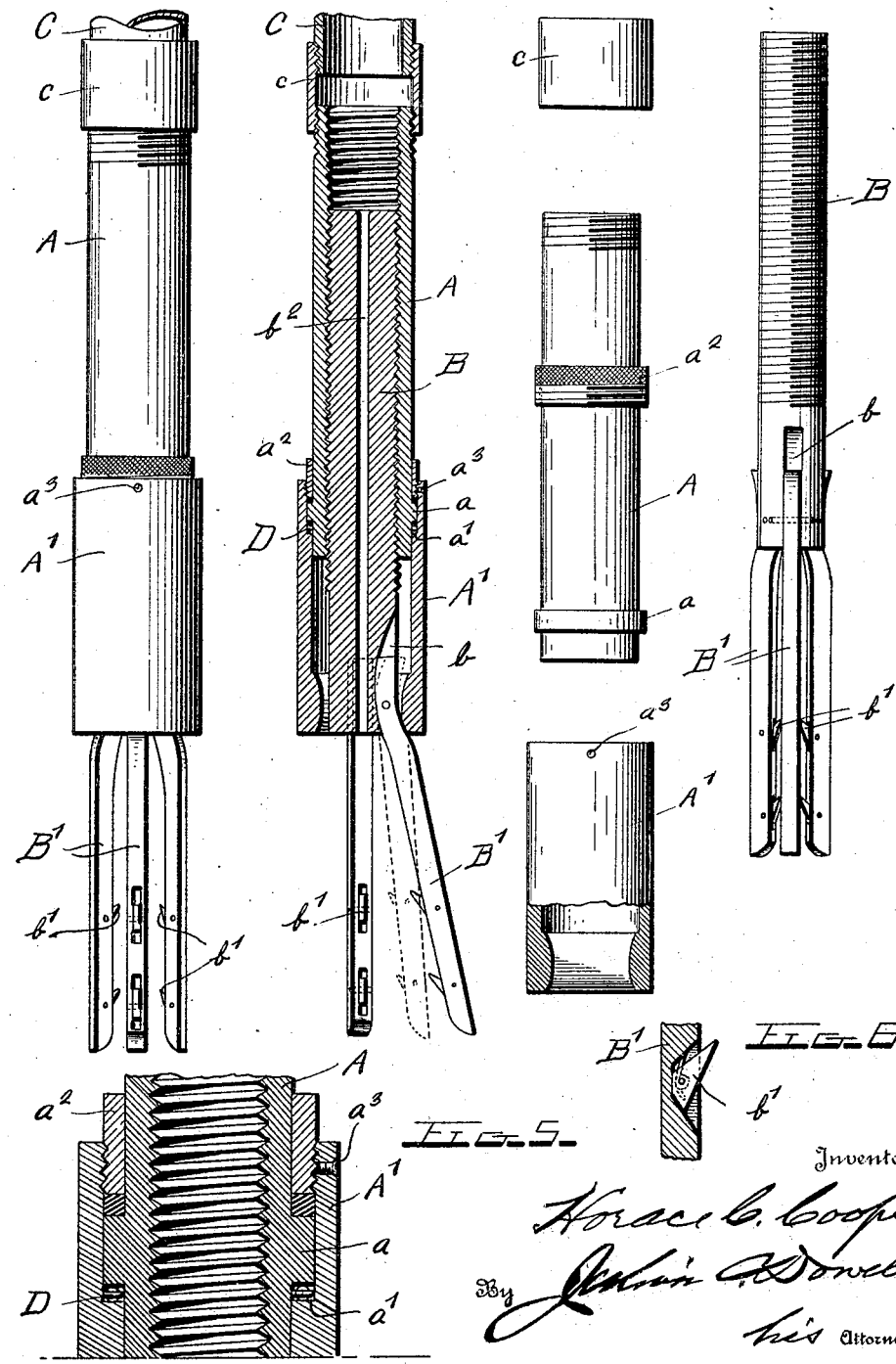
H. C. COOPER.
FISHING TOOL.
APPLICATION FILED APR. 15, 1921.
1,415,995. Patented May 16, 1922.

HORACE C. COOPER, OF ARDMORE, OKLAHOMA, ASSIGNOR OF ONE-HALF TO DAVID N. STEWART, OF ARDMORE, OKLAHOMA.

FISHING TOOL.

1,415,995.  Specification of Letters Patent.  Patented May 16, 1922.

Application filed April 15, 1921. Serial No. 461,513.

*To all whom it may concern:*

Be it known that I, HORACE C. COOPER, a citizen of the United States, residing at Ardmore, in the county of Carter and State of Oklahoma, have invented certain new and useful Improvements in Fishing Tools; and I do hereby declare the following to be a full, clear, and exact description of the invention, such as will enable others skilled in the art to which it appertains to make and use the same.

This invention relates to devices for removing from drilled oil wells or the like drill bits and other tools which may become detached in drilling and fall into the drilled well hole.

The objects of the invention are to provide an efficient and reliable fishing tool so constructed that it can be easily manipulated and having all of its parts so combined and secured together that no part thereof is liable to become disconnected and drop off when the instrument is inserted in a drilled well hole, and having no screw-threads exposed so as to come into contact with mud and dirt or water which is liable to seriously interfere with the operation of the device.

The invention will first be hereinafter more particularly described, with reference to the accompanying drawings, which form a part of this specification, and are to be taken as a part of the description.

In said drawings,

Fig. 1 is a side elevation of a fishing tool embodying my invention, the grappling fingers being shown in position for insertion in a drilled well hole;

Fig. 2 is a vertical longitudinal sectional elevation of the same, showing the grappling fingers or prongs spread apart for gripping a tool or other device therebetween; one of said fingers being indicated in dotted lines;

Fig. 3 is a side elevation of the tubular members in which the grappling tool proper is housed arranged in proper position for assembling the same;

Fig. 4 is a side elevation of the grappling tool proper removed from its housing;

Fig. 5 is a fragmenary detail sectional view on a slightly enlarged scale of a broken away portion of the device, showing the swiveled connection between the upper and lower tubular members with anti-friction bearings to facilitate rotation of one member upon or within the other for actuating the grappling fingers; and Fig. 6 is a fragmenary detail view of a broken away portion of one of the grappling fingers.

Referring to said drawings, in which the same reference letters are used to denote corresponding parts in different views, the letters A and $A^1$, denote, respectively, an upper interiorly threaded tube and a lower tube swiveled to said upper tube, the latter being interiorly threaded and having an exteriorly threaded shank B, of the grappling tool proper, screwed therein. The tube A is also exteriorly threaded at its upper end for connection with the interiorly threaded end of a pipe section or operating handle member C having a sleeve or coupling member $c$ screwed thereon, said tube also having at its lower end an exterior annular rib or collar $a$ over which is fitted the upper end of the tubular member $A^1$, said upper end being interiorly recessed or the bore of the tube enlarged at that end to receive the collar $a$ and form a shoulder $a^1$ between which and said collar are placed a series of balls D to relieve friction and facilitate rotation of the grappling tool and its operating handle or pipe member C, the weight of which rests thereon when the tool is inserted in a drilled well hole and forced down for the purpose of grappling a lost tool. To prevent the tube A from being withdrawn from the tube $A^1$ when the tool is raised, and to prevent the escape of oil from the bearings, a stuffing-box like connection is formed by means of a lock nut $a^2$, slidingly fitted on the tube A, and screwed into the recessed end of the tube $A^1$ above the collar, and between it and the collar sufficient space is left for packing material. The nut or sleeve $a^2$ is fixed on the tube $A^1$ by means of a set screw $a^3$ having its head countersunk in the tube. The lower end of the shank B is recessed longitudinally, preferably at equi-distant points around the same, as at $b$, and within said recesses are pivotally secured an equal number of grappling fingers or prongs $B^1$, which are adapted to grasp therebetween a drill bit or other tool to be removed from the drilled well hole, when the fishing tool is lowered therein so that the fingers $B^1$ may grip and hold the bit when the fishing tool is raised. The free ends of the fingers $B^1$ are preferably beveled or inclined outwardly so that when pressed down upon the earth or an article to be gripped thereby, they tend to open out or spread apart so as to receive the article therebetween, and their pivoted end portions are curved or bent so as to present a convex surface on the inner side thereof arranged to bear against the concave bottom of the recess $b$ in the lower end of the shank B, while their outer sides are concave and bear against the convex surface of the enlargement at the lower end of the tube $A^1$. This construction causes the fingers $B^1$ to be spread apart at their lower ends when the tube A is rotated so as to cause the fingers to advance into position to grip a tool and to be drawn together so as to firmly grip and hold the tool or other article at the bottom of a drilled well hole when the tube A is rotated in a reverse direction. To insure a firm hold and prevent the fingers $B^1$ from slipping off the tool to be removed from the drilled well hole, spring actuated dogs $b^1$ are pivotally secured within recesses formed in the lower ends of the fingers, said dogs being normally pressed outwardly by the springs and adapted to swing back into the recesses with their outer sides or edges flush with the inner sides or edges of the fingers. The shank B is preferably axially bored, at at $b^2$, for the introduction of water, if desired, on account of the accumulation of sand at the bottom of the drilled well hole.

I thus provide a very strong, reliable, efficient and durable fishing tool, which is not liable to get out of order, and the screw threaded parts of which are not liable to be injured and cannot become gummed up or clotted with mud, as there are no screw threads exposed on the outer side of the tool, and all of its parts are assembled and secured together in such manner as to prevent or at least reduce to a minimum the liability of any part becoming disconnected when the tool is inserted in a drilled well hole or withdrawn therefrom.

In operation, the tool is inserted and lowered in the drilled well hole with the grappling fingers or prongs in such position that they will not cut into the side walls, and on reaching the bottom the lower ends of the fingers are spread apart, by rotating the tubular member A through the medium of the operating handle or pipe section C, so that the fingers will advance and take over or receive therebetween a tool or article to be removed, whereupon, by rotation of the operating handle or pipe section C and tubular member A connected thereto in a reverse direction, the fingers will be retracted and caused to firmly grip and hold the article as the fishing tool is drawn out of the drilled well hole with the lost tool or other article gripped between said fingers.

As will be seen, the tubular member $A^1$ may rotate freely in either forward or backward direction without advancing or retracting the grappling fingers, while rotation of the sleeve A is either forward or backward direction will cause the grappling fingers to be either advanced, for the purpose of receiving a tool therebetween, or retracted, for the purpose of gripping an article to be removed from the drilled well hole.

Having thus described my invention, what I claim as new and desire to secure by Letters Patent is:

1. A fishing tool comprising upper and lower tubular members, said upper member being interiorly screw threaded and having said lower member swiveled thereto, an exteriorly threaded shank screwed into said upper member, said shank having a plurality of recesses in its lower end, and grappling fingers pivoted in said recesses; said lower member having an interior annular convex surface adjacent the pivoted end portions of said fingers, and the latter having concave surfaces opposed to said convex surface of said lower member, whereby said fingers are caused to advance and be spread apart when said upper member is rotated in one direction and brought together and retracted within said lower member so as to firmly grip a tool or other article therebetween when said upper member is rotated in the opposite direction.

2. A fishing tool comprising upper and lower tubular members, said upper member being interiorly screw threaded and having said lower member swiveled thereto, a threaded shank screwed into said upper member having a plurality of recesses therein, the bottoms of said recesses being concave, and a plurality of grappling fingers pivoted in said recesses, said lower member having its lower end enlarged and provided with an annular interior convex surface, and the pivoted ends of said fingers being curved or bent in substantially concavo-convex form and having the convex surface thereof bearing against the concave bottoms of said recesses and the concave surface thereof bearing against the convex surface of said lower member.

3. A fishing tool comprising upper and lower tubular members, said upper member being interiorly screw threaded and having said lower member swiveled thereto, an axially bored exteriorly threaded shank screwed into said upper member and having a plurality of recesses in its lower end, and grappling fingers pivoted in said recesses; said lower member having at its lower end an interior annular convex surface and the pivoted end portions of said fingers having concave surfaces bearing against said convex surface of said lower member, whereby said fingers are caused to advance and be spread apart when said upper member is rotated in one direction and brought together so as to firmly grip a tool or other article therebetween and retracted within said lower member when said upper member is rotated in reverse direction.

4. A fishing tool comprising an exteriorly threaded elongated body secured into an interiorly threaded tube and having a plurality of grappling fingers or prongs pivotally secured thereto, a tubular member revolubly mounted on said interiorly threaded tube, and means associated therewith whereby said fingers are caused to advance and be spread apart when said tube is rotated in one direction and drawn together and retracted by rotation of said tube in an opposite direction.

5. The combination in a fishing tool of an oblong exteriorly threaded body having a plurality of recesses in its lower end, said recesses having concave bottoms, grappling fingers pivoted in said recesses, an interiorly threaded tube screwed on said body, and a tubular member relatively revolubly mounted on said interiorly threaded tube, the pivoted end portions of said fingers having convex inner sides bearing upon the concave bottoms of said recesses, and concave outer sides bearing upon a convex annular interior portion or enlargement at the lower end of said tubular member, whereby rotation of said interiorly threaded tube in one direction will cause said fingers to advance and open outwardly to receive a tool therebetween while rotation thereof in the opposite direction will cause said fingers to be brought together and retracted within said tubular member.

6. In combination, a fishing tool having an exteriorly threaded shank portion screwed into an interiorly threaded tube, said tube having a tubular member revolubly secured thereto, a plurality of grappling fingers or prongs pivoted at one end to said shank portion so as to adapt said tubular member to impinge thereon and draw them together when said threaded shank portion recedes into said tubular member, and antifriction bearings for said tube adapted to support the tube and superposed parts and to facilitate rotation thereof when the tool is inserted in a drilled well hole.

7. A fishing tool comprising an oblong exteriorly threaded shank having a recessed end portion and grappling fingers pivoted in said recesses, said recesses having concave bottoms, and said fingers having the inner sides of their pivoted end portions curved to conform to the curvature of said concave bottoms and concave on their outer sides, a tubular member relatively revolubly secured on said interiorly threaded tube and having at its lower end an interior annular enlargement having a convex surface bearing against the concave surface of said fingers, and a pipe section or handle secured to the upper end of said exteriorly threaded tube for rotating the latter when the tool is lowered into a drilled well hole.

In testimony whereof I affix my signature in the presence of two witnesses.

HORACE C. COOPER.

Witnesses:
CATHERINE M. SMITH,
GEORGE H. PHELPS.